United States Patent [19]
Myers

[11] 3,760,693
[45] Sept. 25, 1973

[54] TANDEM SERVOMOTOR PARTITION
[75] Inventor: Lawrence R. Myers, South Bend, Ind.
[73] Assignee: The Bendix Corporation, South Bend, Ind.
[22] Filed: Mar. 15, 1972
[21] Appl. No.: 234,747

[52] U.S. Cl. ............................ 92/48, 92/94, 92/97, 92/99
[51] Int. Cl. ............................ F01b 19/00
[58] Field of Search .................... 92/48, 63, 64, 94, 92/96, 97, 98 RD, 99, 101, 102

[56] References Cited
UNITED STATES PATENTS

| | | | |
|---|---|---|---|
| 3,292,502 | 12/1966 | Myers et al. | 92/94 X |
| 3,013,536 | 12/1961 | Cripe | 92/48 X |
| 3,103,855 | 9/1963 | Hager et al. | 92/48 |
| 3,158,930 | 12/1964 | Wesstrom et al. | 29/510 |
| 3,373,662 | 3/1968 | Voll et al. | 92/48 X |
| 3,411,414 | 11/1968 | Brown et al. | 92/48 X |
| 3,517,588 | 6/1970 | Kytta | 92/48 X |

*Primary Examiner*—Martin P. Schwadron
*Assistant Examiner*—Abe Hershkovitz
*Attorney*—Leo H. McCormick et al.

[57] ABSTRACT

A tandem servomotor having a separation spacer with a fixed flow path for bleeding pressurized air into a vacuum chamber when the rear diaphragm is misassembled to prevent the creation of a rear pressure differential in the rear chamber upon initial actuation. The output from the tandem servomotor will be proportionally reduced as the resulting force produced by the pressure differential is reduced. This reduction in output force will signal an internal malfunction of the servomotor upon assembly.

2 Claims, 3 Drawing Figures

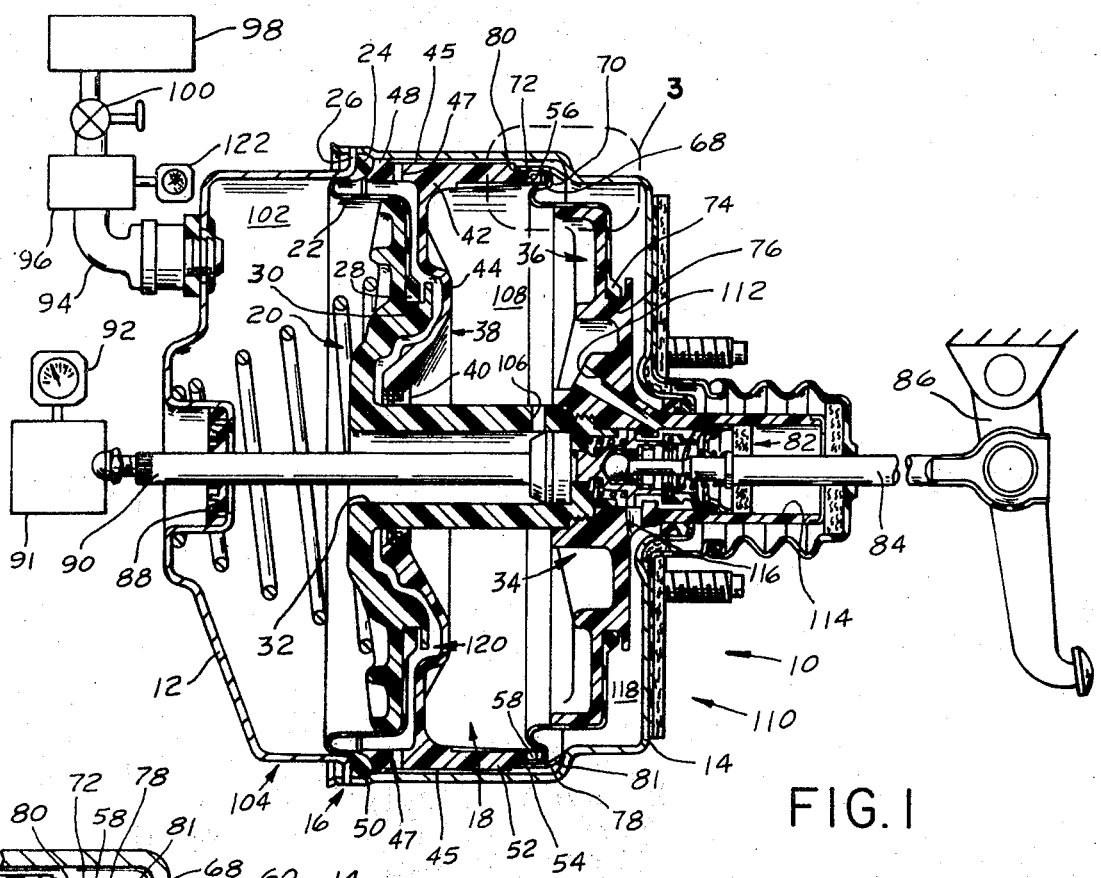
FIG. 1
FIG. 3
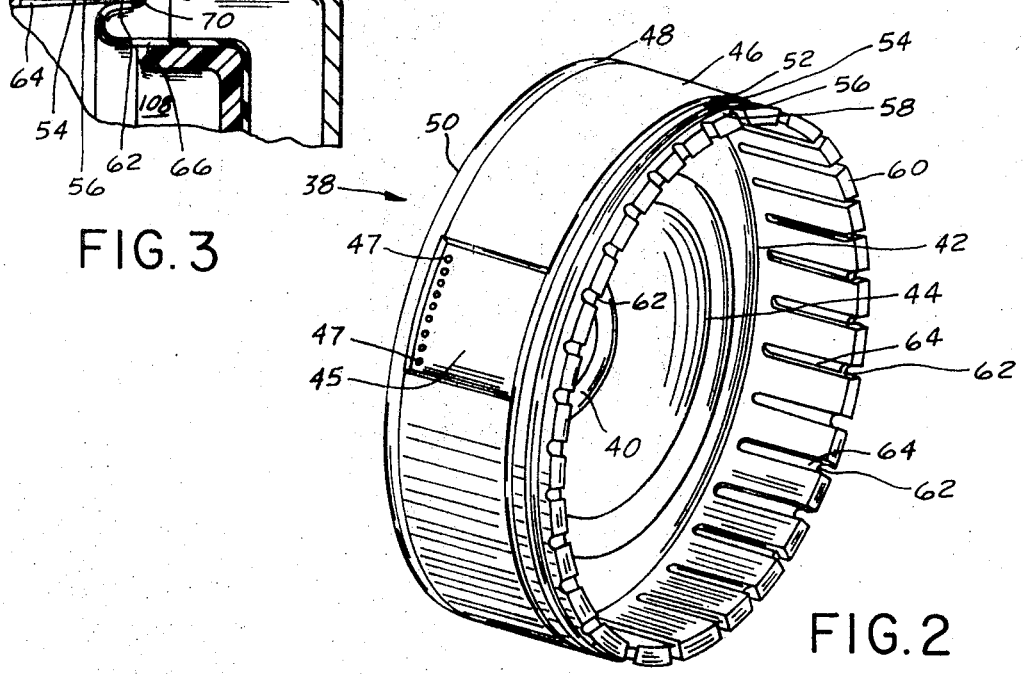
FIG. 2

TANDEM SERVOMOTOR PARTITION

BACKGROUND OF THE INVENTION

Tandem servomotors are constructed in sections. A front shell has a shoulder on which an associated front movable wall means, partition and rear movable wall means are layered. The rear movable wall means has a rear diaphragm which has an external bead which is held against a shoulder groove on the partition by a retainer. The retainer has a plurality of fingers which engage the rear shell to resiliently bias front diaphragm of the front wall means against the shoulder on the front shell when the front and rear shell are joined together forming the external housing of the tandem servomotor. However, occassionally due to differences in tolerances in the retainer, partition and external bead of the rear diaphragm when the fingers engage the rear shell the retaining means is slightly distorted out of round. Upon creating a pressure differential across the rear diaphragm the external bead will be separated from the shoulder groove. In assembling the servomotor, normally only a single application is required to bench test and safety pass a tandem servomotor. Under some conditions when the rear bead is partially separated from the partition the tandem servomotor will pass this safety inspection, however, with repeated application the external bead would be completely pulled away from the partition rendering the creation of an operational pressure differential within the servomotor impossible.

SUMMARY OF THE INVENTION

I have devised a partition means having a leak path for transmitting air at atmospheric pressure during an initial application when an external bead on the diaphragm separates from the partition means. This leak path is created by a plurality of slots cut along the edge of the peripheral surface of the partition which merges into an axial groove in the internal surface of the peripheral surface. A vacuum analyzer is connected between a source of vacuum and the servomotor. The source of vacuum evacuates the servomotor to a predetermined level as shown by the vacuum analyzer. A fixed input force is applied to the actuator means which terminates the communication of vacuum with the rear chambers and initiates communication of air at pressure. With air under pressure in the rear chamber and vacuum in the front chambers, a pressure differential will be created across the front and rear diaphragms causing the front and rear wall to move and transmit an output force. If the retainer permits the external bead of the rear diaphragm to separate from the partition, when the pressure differential is created, the slots and axial groove will provide a leak path through which the air can readily flow into the vacuum chamber. The vacuum analyzer will sense any change in the vacuum in the servomotor and display a signal giving an indication that an internal malfunction has occurred upon initial application of the servomotor.

It is therefore an object of this invention to provide a means for determining a diaphragm and partition spacer separation upon an initial application of a servomotor.

It is another object of this invention to provide a plurality of leak paths around a partition member of a tandem servomotor to readily contaminate a plurality of vacuum chambers upon separation with a rear diaphragm during an initial operation.

It is still a further object of this invention to provide a partition member with a forward gripping surface for holding a front diaphragm and a plurality of teeth extending from the rear surface which cooperate with a retaining ring for holding a rear diaphragm upon joining the front and rear shells of a tandem servomotor.

These and other objects will become apparent to those who read this specification and view the drawing.

BRIEF DESCRIPTION OF THE DRAWINGS

FIG. 1 is a sectional view of a tandem servomotor connected to a source of vacuum with a vacuum analyzer and an output pressure indicator.

FIG. 2 is a prospective view of a partition means for a tandem servomotor having a plurality of teeth on the rear face for holding the rear diaphragm, the teeth provide a leak path to permit air under pressure to pass therethrough when a diaphragm is separate from a shoulder groove position.

FIG. 3 is an exploded view of the circled portion 3 of FIG. 1.

DETAILED DESCRIPTION OF THE PREFERRED EMBODIMENT

A tandem fluid pressure servomotor 10 shown in FIG. 1 has a front shell 12 and a rear shell 14 joined together by a twist lock means 16 of a type disclosed in U. S. Pat. No. 3,158,930, owned by the common assignee of this application and incorporated herein by reference. Upon joining the front shell 12 to the rear shell 14, a cavity 18 will be created.

Before joining the front shell 12 to the rear shell 14, a front wall means 20 having a first flexible diaphragm 22 with an external bead 24 is placed on shoulder 26 of the front shell 12. The first diaphragm 22 has an interior bead 28 which snaps into a groove 30 on the front wall means 20. The front wall means 20 has a central tube 32 which is connected to a hub means 34 on the rear wall means 36. A partition or spacer means 38 has an inner diameter section 40 with a central opening which surrounds the tube 32. The inner diameter section 40 is separated from an external section 42 by a web section 44. The external section 42 has a peripheral surface 46, see FIG. 2, with a front face 48 having a slanted edge 50 which engages the external bead 24 of the first diaphragm 22. The peripheral surface 46 has a rear face 52 which is stepped by shoulder 54 into a groove 56. A narrow lip 58 extends from the groove 56 to the rear edge 60. The rear edge 60 is broken by a plurality of series of radial slots 62 that are substantially perpendicular to the peripheral surface 46. Correspondingly a series of axial grooves 64 extend from the slots to a point adjacent the central web 44. A plurality of axial grooves 45 extend from the rear face 52 to a corresponding plurality of holes 47 adjacent the front face 48.

The rear wall means 36 has a second flexible diaphragm 66 with an annular groove 68 in a rectangular convolution 70. An inwardly projecting annular rib 72 is secured adjacent the end 80 to mate with the groove 56 in the partition means 38 when the narrow lip 58 is positioned in groove 68, see FIG. 3. The second flexible diaphragm 66 has an internal bead 74 which snaps into a groove 76 on the rear wall means 36.

After the external bead 70 is placed against the stepped shoulder 54, a retainer means 78 is placed around the external bead 70. The area of the narrow lip 58 between the slots 62 on the rear edge 60 acts as a plurality of teeth to help hold the diaphragm rib 72 in groove 56 and edge 80 adjacent the stepped shoulder 54. The retainer means 78 in turn has a plurality of fingers 81 which engage the rear shell 14 to resiliently bias the gripping surface 50 against the external bead 24 and front shell 12 through the partition means 38.

The hub means 34 carries valve means 82 which is connected by push rod 84 to an input member 86. The tube or sleeve 32 in conjunction with seal bearing 88 holds an output push rod 90 in axial alignment with the input push rod 84. The output push rod 90 is connected to a force measuring apparatus 91 which gives a visual indication thereof on gage 92.

MODE OF OPERATION OF THE PREFERRED EMBODIMENT

When a tandem servomotor 10 has been assembled, before it is delivered to a user, it is initially checked for operational qualities to determine if safety standards are met. To establish this test, operational conditions must be simulated. The tandem servomotor 10 is connected by a conduit 94 to a vacuum analyzer 96. The vacuum analyzer 96 is connected to a source of vacuum 98. A shut off valve 100 is opened and vacuum is communicated to the first vacuum chamber 102 in the front portion 104 of the servomotor 10. From the first vacuum chamber 102, the vacuum is communicated through the interior of the sleeve 32 to holes 106, only one being shown, into a second vacuum chamber 108 in the rear portion 110 of the servomotor 10. From the second vacuum chamber 108, vacuum is communicated through passage 112 to the hub bore 114, past the valve means 82 and through passageway 116 into the second power chamber 118. From the second power chamber 118 the vacuum is communicated around fingers 81 of the retainer means 78 through axial grooves 45 to radial holes 47 and into the first power chamber 120. When the source of vacuum has evacuated the servomotor 10 of air as indicated by gage 122 of the vacuum analyzer 96, shut off valve 100 is turned off. A predetermined input force is applied to input member 86 which in turn actuates valve means 82 to sequentially terminate vacuum communication through passage 112 and permit air under pressure to pass through passageway 116 into the second power chamber 118. The air under pressure travels through the axial grooves 45 and holes 47 into the first power chamber 120 to create a first and second pressure differential across the first and second wall means 20 and 36 respectively. With a known input force on the input member 86, the pressure of the air introduced to the power chamber 118 and 120, and the value of the vacuum as indicated from the gage 122 on the analyzer 96, the value of the output force on gage 92 can be calculated. The input force is retained on the input member 86 for a set period of time and the gages 92 and 122 observed. If the gages do not fluctuate, the tandem servomotor 10 has passed the safety standard test.

When fluctuations in either gage 92 or 122 can indicate an internal malfunction in the servomotor 10, the most likely malfunction will occur because the external bead 70 is separated from the stepped shoulder 54 of the partition means 38 by the pressure differential acting on the diaphragm 66 in an area unrestrained by the retainer means 78. Upon separation sufficiently to move rib 72 out of groove 56, a leak path will be formed through slot 62 and groove 64 into the second vacuum chamber 108, permitting air under pressure to enter. Any change in the vacuum in chamber 108 will be transmitted through holes 106 into the first vacuum chamber 102 where the change will be interpreted by the vacuum analyzer 96 and displayed on gage 122. Corresponding with air transmitted to the first and second vacuum chambers 102 and 108, respectively, the pressure differential across walls 20 and 36 will also be reduced. This reduced pressure differential will in turn be related to a lower output force received by measuring apparatus 91 and displayed on gage 92. Thus, an operator upon initially supplying a known input force for a predetermined period of time to input member 86 will be able to ascertain if the output from push rod 90 displayed on gage 92 and the vacuum as displayed on gage 122 fall within the set standards for safely operating a power brake system. If the operating characteristics of the servomotor under test do not conform, further analysis will be performed to determine if the servomotor should be rejected. The above testing operation can be performed, in about 30 seconds, immediately on the servomotor when it comes off of the production assembly line to assure safety standards of all units produced are conformed with.

I CLAIM:
1. A tandem servomotor comprising:
a housing having a front shell and a rear shell joined together to form a cavity therein;
spacer means having a central web between an inner diameter section and an outer diameter section, said outer diameter section having a peripheral surface, said peripheral surface being located between the front shell and the rear shell, said central web dividing the cavity into a first portion and a second portion, said peripheral surface having a front face and a rear face, said spacer means having a first edge with a gripping surface attached to the front face of said peripheral surface, said peripheral surface having a narrow lip projecting from a stepped shoulder adjacent the rear face, said narrow lip having a series of slots substantially perpendicular to the rear face, said peripheral surface having a series of grooves extending along the interior thereof from adjacent said central web to said slots, said peripheral surface having a plurality of axial grooves extending to radial holes adjacent said first edge;
a first flexible means having a frist external bead located between said gripping surface and the front shell and a first interior bead connected to a first wall, said first flexible means and said first wall dividing said first portion into a first vacuum chamber and a first power chamber;
a second flexible means having an annular groove in a thickened second external bead adapted to receive the lip portion of said spacer means and a second internal bead connected to a second wall, said second flexible means and said second wall dividing said second portion into a second vacuum chamber and a second power chamber, said second external bead having an inwardly projecting rib at the end thereof adapted to abut the stepped portion of said spacer means;

retaining means secured to said spacer means by surrounding said second external bead for holding said rib in said stepped portion, said retaining means having a portion engaging the rear shell to resiliently bias the first external bead between said gripping surface through the spacer means and the front shell; and actuation means connected to said first and second walls through which a vacuum is frelly communicated to said first and second vacuum chambers and vacuum and air under pressure selectively communicating to said second power chamber thence to said first power chamber by the axial grooves and radial holes in said spacer means, said actuation means moving in response to an input force permitting air under pressure to be communicated to the first and second power chambers establishing a pressure differential with the first and second vacuum chamber across the first and second walls, said pressure differential causing said first and second walls to move and drive an output member with a predetermined force, said air at atmospheric pressure in the second power chamber following a path around said rib through said slots and grooves along the interior of the peripheral surface of the spacer means into the second vacuum chamber with said rib away from the stepped portion of the spacer to negate the pressure differential across the second wall and reduce said output force to signal an internal malfunction of the servomotor upon initial assembly.

2. The tandem servomotor, as recited in claim 1, wherein said slots are spaced along the edge of the rear face to form teeth which cooperate with said retaining means to hold the second external bead in a fixed position with respect to said spacer means.

* * * * *